United States Patent [19]

Enz

[11] Patent Number: 4,797,766
[45] Date of Patent: Jan. 10, 1989

[54] MAGNETIC HEAD WITH MAGNETORESISTIVE ELEMENT

[75] Inventor: Ulrich E. Enz, Eindhoven, Netherlands

[73] Assignee: U.S. Philips Corporation, New York, N.Y.

[21] Appl. No.: 929,940

[22] Filed: Nov. 12, 1986

[30] Foreign Application Priority Data

Feb. 17, 1986 [NL] Netherlands .................. 8600390

[51] Int. Cl.$^4$ ................ G11B 5/127; G11B 5/33
[52] U.S. Cl. ................................................ 360/113
[58] Field of Search .................. 360/113, 125; 365/8, 365/158; 324/252; 338/32 R

[56] References Cited

U.S. PATENT DOCUMENTS 4,617,600 10/1986 Somers .............................. 360/113

Primary Examiner—Stuart N. Hecker
Assistant Examiner—David J. Severin
Attorney, Agent, or Firm—F. Brice Faller

[57] ABSTRACT

Magnetic head for reading information from a magnetic registration medium. Comprises a magnetic yoke (3) having two limbs (3A, 3B) whose free ends constitute pole faces (3A1, 3B1) on either side of a read gap (7). A magnetoresistive element (15A, 15B) provided within the magnetic yoke at a distance from the pole faces is constituted by a layer of Bi provided on the magnetic intermediate yoke (13). Viewed in the longitudinal direction of the read gap, the layer of Bi extends on either side of this gap and at least during operation it is in a constant magnetic field directed transversely to the layer of Bi.

12 Claims, 1 Drawing Sheet

MAGNETIC HEAD WITH MAGNETORESISTIVE ELEMENT

BACKGROUND OF THE INVENTION

The invention relates to a magnetic head, particularly for reading information from a magnetic registration medium, which magnetic head comprises a magnetic yoke having two limbs spaced at a distance from each other whose free ends constitute pole faces on either side of a read gap present between the limbs. The magnetic head also comprising a magnetoresistive element present within the magnetic yoke at a distance from the pole faces.

A magnetic head of the type described in the opening paragraph is known from U.S. Pat. No. 4,150,480, hereby incorporated by reference. The operation of such a magnetic head is based on the use of a strip shaped element of a ferro magnetic metallic material provided on a non-magnetic substrate, which element is provided in the vicinity of a magnetic registration medium for reproducing its information contents. The magnetic field of the passing registration medium brings about changes in the magnetisation state of the element and modulates its electric resistance via the so-called magnetoresistive effect. This means that the output signal of a detection circuit, which is connected to the magnetoresistive element, is a function of the information stored in the registration medium.

Since the change of the electric resistance of the magnetoresistive element under the influence of an external magnetic field is quadratic, it is common practice to improve the operation of the magnetic head by linearizing the resistance-magnetic field characteristic upon reproduction of signals. This can be realized in the known magnetic head, by positioning the axis of easy magnetisation parallel to the longitudinal axis of the magnetoresistive element and by providing means in the form of equipotential strips of a satisfactorily conducting material. Such a method is known from the article "The Barberpole, a linear magnetoresistive head" in IEEE Transactions on Magnetics, September 1975, Vol. Mag. 11, No. 5, pages 1215-1217.

Although the relation between the change of resistance of the magnetoresistive element and the intensity of the signal field can be linearized in a first approximation, for example, by means of the above-mentioned bias method, a drawback of the practical use of the known magnetoresistive head is that the noise level is high. This so-called modulation noise, also referred to as Barkhausen noise, is the result of the occurrence of more than one magnetic domain in the magnetoresistive element so that staggered domain walls are produced. Magnetic heads of the above-mentioned known type are also often comparatively little sensitive to small magnetic fields.

The modulation noise occurring and the low sensitivity have of course a detrimental influence on the signal to noise ratio of the known magnetic head.

SUMMARY OF THE INVENTION

The object of the invention is to provide a magnetic head of the magnetoresistive type which provides the possibility of reproduction with a satisfactory signal to noise ratio.

To this end the magnetoresistive element is formed by a layer of Bi provided on a magnetic intermediate yoke arranged between the limbs of the magnetic yoke, which layer of Bi, viewed in the longitudinal direction of the read gap, extends on either side of the gap and at least during operation is present in a constant magnetic field directed transversely to the layer of Bi.

By using bismuth as a magnetoresistive material it is achieved that the Barkhausen noise no longer occurs; bismuth is a non-magnetic material in which consequently domain walls can not be formed.

With the constant magnetic field directed transversely to the layer of Bi the reproduction characteristic of the magnetoresistive element formed by the layer of Bi can be linearized in order to displace the operating point to a linear ration of the resistivity-magnetic field curve. The resistivity $\rho$ of a bismuth element being, for example, a layer, film or a wire changes into a magnetic transversal field in an approximation according to $\Delta\rho/\rho = K.H^2$ in which H represents the magnetic field strength in Oersted and in which K $10^{-8}$ Oe$^{-1}$. For a static transversal field with H=5000 Oe taken as an example it is possible to derive $(\delta/\delta H)(\Delta\rho/\rho) = 10^{-4}$ Oe$^{-1}$.

This means that for a suitably chosen constant magnetic field a small magnetic variation yields a large resistance change and consequently the magnetic head has a great sensitivity to small magnetic field variations of the registration medium to be read out.

The two above-mentioned favourable properties of the magnetic head according to the invention result in a satisfactory signal to noise ratio of the magnetic head.

Although the constant magnetic field may be produced by an electric coil wound around a core, a permanent magnet is preferred which is provided between the limbs of the magnetic yoke. In connection with the generally desired small dimensions and relatively high field strength high-grade magnets such as Samarium cobalt and Neodymium-ironboron are eminently suitable.

An embodiment which is attractive from a technological point of view is characterized in that the layer of Bi consists of two at least substantially rectangular strips present on either side of the gap. The intermediate yoke formed from a material having a high magnetic permeability such as CoZr and the layer of Bi may be provided on the magnet by means of a thin-film technique.

Furthermore it may be desirable, notably if the intermediate yoke is electrically conducting, that an electrically insulating intermediate layer is provided between the layer of Bi and the intermediate yoke.

The magnetic head according to the invention is also characterized in that the layer of Bi near the gap and also at the ends remote from each other on either side of the gap is provided with electric connection conductors for incorporating the layer of Bi in an electric circuit for detecting resistance changes, which circuit comprises a current source.

DETAILED DESCRIPTION OF THE PREFERRED EMBODIMENT

Figure 1:
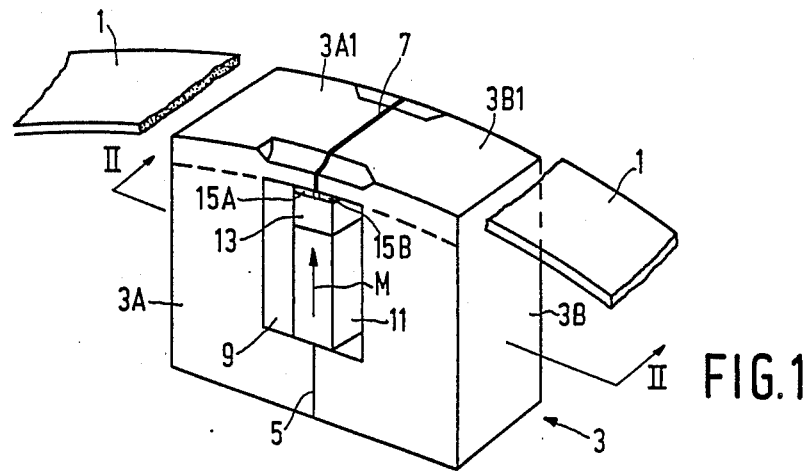
FIG. 1 is a perspective elevational view of a magnetic head according to the invention.
Figure 2:
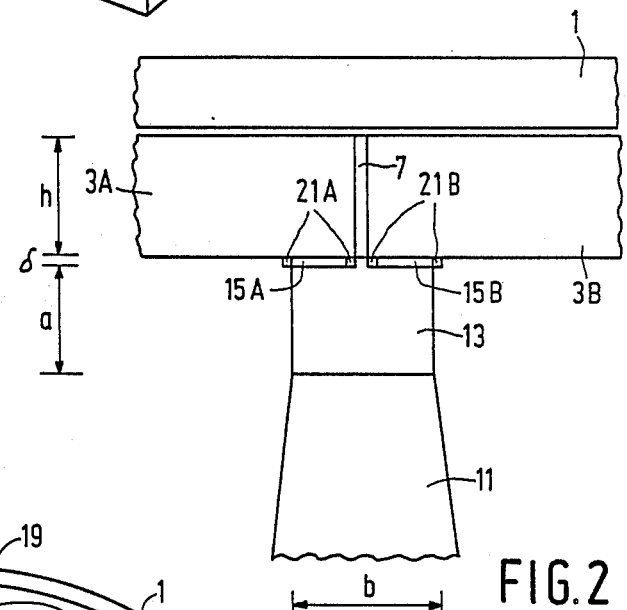
FIG. 2 shows part of a cross-section II—II on a larger scale according to FIG. 1.

The magnetic head shown in FIG. 1 is intended to detect information representing magnetic fields, originating from a magnetic tape 1. The magnetic head comprises a magnetic yoke 3 consisting of two halves which are bonded together, for example, by means of glass in the region 5. The magnetic yoke 3 has two parallel limbs 3A and 3B spaced at some distance from each other, whose free ends constitute the pole faces 3A1 and 3B1, respectively. A layer of a non-magnetisable material such as glass and/or quartz defining a read gap 7 is present between the two pole parts forming the faces 3A1 and 3B1. The thickness of this layer, which may also be used to bond the limbs 3A and 3B of the magnetic yoke 3, may be of the order of 3000 Å. The magnetic yoke is made of a ferro-magnetic material, preferably a ferrite such as polycrystalline MnZn or NiZn ferrite. From a manufacturing point of view it may be desirable to form the pole faces 3A1 and 3B1 at the ends of the magnetic yoke 3 by providing an extra layer of, for example, a mono-chrystalline MnZn ferrite. The thickness of the layer in question is indicated by the reference h in FIG. 2.

A central aperture 9 in which a permanent magnet 11 of a high-grade permanent magnetic material such as samarium-cobalt is secured is present between the two limbs 3A and 3B of the magnetic yoke. The magnet is rectangular in cross-section and positioned in such a way that a symmetry plane thereof coincides with the plane in which the gap 7 is located. In FIG. 1 an arrow M denotes a possible magnetic direction of the magnet 11. For practical considerations the magnet 11, which has only small dimensions, may be enclosed between two substrates so as to make it easier to secure it. The magnet 11 may also be wedge-shaped, to some extent.

The pole side of the magnet 11 facing the gap 7 is coated with a layer constituting an intermediate yoke 13 of a material having a high magnetic permeability such as alloys on an Ni-Fe basis, Al-Fe-Si based alloys, amorphous magnetic alloys and ferrites. The thickness of the intermediate yoke 13 is denoted by the dimension "a" in FIG. 2.

A layer of Bi consisting of two rectangular strips 15A and 15B is provided on the intermediate yoke 13. Dependent on the choice of material of the intermediate yoke 13, the layer of Bi may be provided directly or indirectly on the intermediate yoke 13. In fact, if the intermediate yoke 13 consists of an electrically conducting material, an electrically insulating intermediate layer is required. Such an intermediate layer is omitted in the Figures for the sake of clarity. The strips 15A and 15B are on either side of the gap 7 and engage the parts forming the pole faces 3A1 and 3B1 of the magnetic yoke 3.

Figure 3:
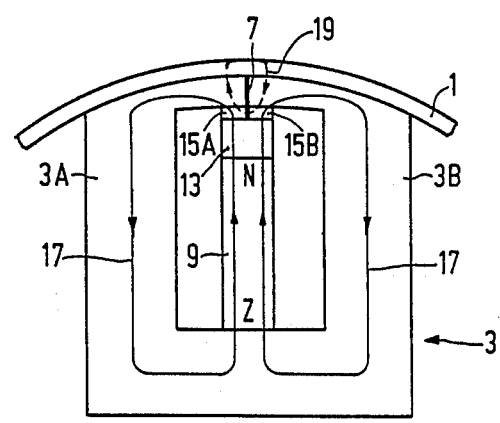
FIG. 3 is a diagrammatical side-view of the magnetic head of FIG. 1

A number of possible dimensions of some of the parts of the magnetic head according to the invention are mentioned by way of example:
thickness of the pole parts: $h=10\ \mu m$
thickness of the Bi layer: $\delta=300$ Å
thickness of the intermediate yoke: $a=10\ \mu m$
width of the magnet: $b=10$–$30\ \mu m$ The permanent magnet 11, the intermediate yoke 13 and the strips 15A and 15B are mutually positioned within the magnetic yoke 3 in such a manner that the field lines of the constant magnetic field originating from the magnet 11 are distributed symmetrically over the layer of Bi. The magnetic field lines are closed via the magnetic yoke 3, as is diagrammatically shown in FIG. 3 by means of two of the field lines denoted by the reference numeral 17. When the magnetic tape 1 is read, the layer of Bi will be in a flux coupling, via the pole faces 3A1 and 3B1, with the magnetic tape whose information representing alternating magnetic field influences the resistance of the magnetoresistive strips 15A and 15B. FIG. 3 diagrammatically shows a field line 19 of the alternating magnetic field. As will be evident from FIG. 3, the simultaneous presence of the constant magnetic field and the alternating magnetic field originating from the magnetic tape causes an antisymmetrical magnetic flux distribution in the layer of Bi, because the alternating magnetic field in one strip 15A or 15B is oppositely directed to the constant magnetic field and simultaneously has the same direction as the constant magnetic field in the other strip 15B or 15A. This effect leads to an asymmetrically alternating resistivity change of the bismuth in the strips 15A and 15B and consequently to an asymmetrically alternating resistance change of the two strips.

Figure 4:
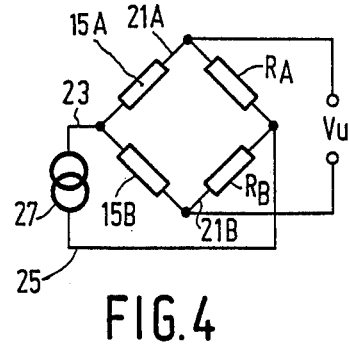
FIG. 4 is a diagrammatical representation of a suitable read circuit.

By electrically connecting the strips 15A and 15B to a suitable circuit, the signalized asymmetrically alternating resistance change can be converted into an output voltage which is a measure of the information-representing alternating magnetic field originating from the magnetic tape 1. A possible circuit is shown diagrammatically in FIG. 4.

The circuit may be a known bridge circuit in which the two strips 15A and 15B are electrically coupled by means of connection conductors 21A and 21B to two resistors $R_a$ and $R_b$, respectively, and in which the two strips are directly connected to a current source 27 by means of a connection conductor 23 and are indirectly connected to this current source by means of a conductor 25. The conductors 21A and 21B present at the ends of the strips 15A and 15B remote from the gap 7 and the conductors 23 present at the ends of the strips facing the gap 7 may be made of Au which is deposited on the Bi layer (see also FIG. 2). The circuit shown in FIG. 4 produces an output signal $V_u$ in case of suitably chosen parameters, which signal represents the resistance changes of the strips 15A and 15B as a function of the alternating magnetic field of the magnetic tape 9.

In a practical case a relative resistance change of the two bismuth strips in a bridge circuit is measured to be $\Delta R/R\ 10^{-4}$ per Oersted of flux in the Bi layer. At a bias of 100 mV this resulted in an output signal of $10^{-5}$ Volt/Oe.

An embodiment is possible in which the Bi layer is formed as a continuous strip in which only three connection conductors need to be present, namely one facing the gap and one at each end of the strip remote from the gap. Furthermore, use of the magnetic head need not be limited to reading a magnetic medium. By providing a coil around the magnetic yoke the magnetic head may also be used as a write head for which the gap indicated as a read gap may also function as a write gap.

What is claimed is:
1. A magnetic head, particularly for reading information from a magnetic registration medium, which magnetic head comprises a magnetic yoke having two limbs spaced at a distance from each other whose free ends constitute pole faces on either side of a read gap present between the limbs and defined thereby, said magnetic head also comprising a magnetoresistive element present within the magnetic yoke at a distance from the pole faces, characterized in that a magnetic intermediate yoke is arranged between the limbs of the magnetic yoke and in that the magnetoresistive element is formed by a layer of Bi provided on said intermediate yoke, which layer of Bi, viewed in the longitudinal direction of the read gap, extends on either side of said gap and at least during operation is present in a constant magnetic field directed transversely to the layer of Bi.

2. A magnetic head as claimed in claim 1, characterized in that the layer of Bi consists of two at least substantially rectangular strips, one provided on either side of said gap.

3. A magnetic head as claimed in claim 1, characterized in that an electrically insulating intermediate layer is provided between the layer of Bi and the intermediate yoke.

4. A magnetic head as claimed in claim 1, characterized in that the layer of Bi near said gap and also at the ends remote from each other on either side of the gap is provided with electric connection conductors for incorporating the layer of Bi in an electric circuit for detecting resistance changes, which circuit comprises a current source.

5. A magnetic head as claimed in claim 1, characterized in that a permanent magnet is provided between the limbs of the magnetic yoke for generating said constant magnetic field, which magnet has a magnetic axis oriented transversely to the layer of Bi.

6. A magnetic head as claimed in claim 5, characterized in that the intermediate yoke is provided on the permanent magnet which itself is secured to the magnetic yoke.

7. A magnetic head for reading information from a magnetic registration medium, said head comprising

- a magnetic yoke having two spaced apart limbs whose free ends define a read gap therebetween, said free ends having pole faces on either side of said gap, said pole faces lying parallel to said registration medium during operation,
- a magnetic intermediate yoke disposed between said limbs adjacent said gap opposite said pole faces,
- a magnetoresistive element formed by a layer of bismuth provided on said intermediate yoke, said layer extending on either side of said gap,
- means for generating a constant magnetic field at least during operation, said field being directed transversely of said layer of bismuth.

8. A magnetic head as in claim 7 wherein an electrically insulating intermediate layer is provided between the layer of bismuth and the intermediate yoke.

9. A magnetic head as in claim 7 wherein said means for generating said constant magnetic field comprises a permanent magnet disposed between said limbs, said magnet having a magnetic axis oriented transversely to the layer of bismuth.

10. A magnetic head as in claim 9 wherein said intermediate yoke is secured to said permanent magnet which is in turn secured to said magnetic yoke.

11. A magnetic head as in claim 7 wherein said layer of bismuth consists of two at least substantially rectangular strips, one provided on either side of said gap.

12. A magnetic head as in claim 11 wherein a pair of electric conductors is connected to each strip of bismuth, one conductor of each pair being connected to the respective strip proximate said gap and the other remote therefrom, whereby said layer of bismuth may be incorporated into an electric circuit for detecting resistance changes.

* * * * *